Patented Apr. 17, 1951

2,548,863

UNITED STATES PATENT OFFICE 2,548,863

SUBSTITUTED GLYCINAMIDES

William F. Bruce, Havertown, and Joseph Seifter, Willow Grove, Pa., assignors to Wyeth Incorporated, Philadelphia, Pa., a corporation of Delaware No Drawing. Application May 29, 1946, Serial No. 673,155

2 Claims. (Cl. 260—561)

This invention relates to new substituted glycinamides having the general formula $R_1R_2NCH_2CONHR_3$ It has been observed by some investigators that a limited number of glycinamide derivatives evidence some local anesthetic action although a systematic study of the pharmacological actions of substituted glycinamides had never been reported.

We have found in the preparation and a thorough study of a considerable number of new, substituted glycinamides that a number of these compounds evidence marked pharmacological actions hitherto unsuspected in the art and which we consider to be highly useful in the medicinal field. Specifically, we have found that when particular amines are used in the preparation of the compounds of our invention, the glycinamide products evidence useful pharmacological action, more specifically described below.

The new compounds of this invention have the general formula as indicated above where $R_1$ stands for a lower alkyl and $R_2$ an alkyl having not more than 9 carbon atoms while $R_3$ represents a branched-chain alkyl radical having 7 to 9 carbon atoms. The group $NHR_3$ in the above formula is specifically intended to represent the residue of a primary pressor amine.

When $R_1$ and $R_2$ are alkyls, the latter may be of the straight-chain or branched-chain type but in any case alkyls of more than 9 carbon atoms are not contemplated since higher alkyls are difficult to evaluate pharmacologically due to solubility problems.

It has been noted that $R_3$ representing higher alkyls of 7 to 9 carbon atoms having a branched-chain configuration confers desirable pharmacological properties on the glycinamide compound.

In general, the compounds of the invention may be synthesized by reacting an appropriate chloracetamide corresponding to the formula $ClCH_2CONHR_3$ where $R_3$ represents the radicals indicated above with an appropriate secondary amine corresponding to the formula $R_1R_2NH$, where $R_1R_2N$ represents the radicals as indicated above.

The amines may be prepared in the usual and known manner. The preferred method for the preparation of the chloracetamide intermediate involves reacting chloracetyl chloride with a primary amine $R_3NH_2$ in the presence of benzene or ether as a solvent for the reactants. Heating may or may not be necessary depending on the speed of the particular reaction. The chloracetamide remains in solution in the solvent and is obtained by distilling off the solvent under reduced pressure. In general, a molar ratio of chloride to amine of about 1:2 is preferred for the reaction.

The reaction of the appropriate chloracetamide and the appropriate secondary amine to form the desired substituted glycinamide is preferably operated with a molar ratio, amide to amine of about 1:1 and is carried out in the presence of a solvent for the reactants such as higher alcohols having 4 to 7 carbon atoms in the molecule, dioxane or hydrocarbon solvents such as xylene. The reaction is carried out in the presence of an acid acceptor or mildly basic material such as alkali or alkaline earth metal carbonates, sodium bicarbonate or alkali metal alcoholates and preferably about 2 to 3 mols of this material is used. The reaction operation is set up for refluxing and the reaction temperature is the refluxing temperature of the particular solvent selected. Generally a reaction or refluxing time of about 10-15 hours is sufficient for complete reaction. In the event that solids are formed, these are removed by filtration, the substituted glycinamide product remaining in solution in the solvent. The latter is finally removed by distillation at low pressures to obtain the desired product.

The new compounds have valuable properties and also are useful in that they possess at least one of the following actions: local anesthetic, pressor, spasmolytic, analgesic, sedative and convulsant action.

It is known that certain amines possess a vasoconstrictor action and are identified as pressor amines. As an important feature of the invention it has been discovered that when pressor amines are used as intermediates in the preparation of the substituted glycinamides, the new products possess pronounced physiological actions. For example, while pressor amines themselves often possess a certain amount of local anesthetic action, a surprising increase in anesthetic action has been found in corresponding glycinamide compounds and in some cases anesthetic combined with pressor action.

It has been discovered in the compounds of the invention having the formula $R_1R_2NCH_2CONHR_3$ that when the radical $R_1R_2N-$ and/or $-NHR_3$ are the residues of secondary and primary pressor amines, respectively, a critically new physiological action is found that is unpredictably different from the physiological action of the pressor amines alone. As an example, 1-methylhexyl amine has a epinephrine equivalent of 0.0037.

When this pressor amine is condensed with chloracetyl chloride to form N-alpha-chloracetyl-1-methylhexyl-amine and the chloracetyl intermediate is further condensed with diethylamine having no pressor activity, the N,N-alpha-diethylamine-N-1-methylhexyl acetamide proves to have a surprisingly good pressor action, namely an epinephrine equivalent of 0.002. Furthermore, the pressor amine residue

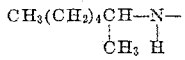

imparts to the glycinamide enhanced local anesthetic action far superior to the anesthetic action of 1-methylhexyl amine itself. In general, this enhanced action is noted when either $R_1R_2N-$ or $-NHR_3$ is a pressor amine residue, particularly in the case where the former is the pressor amine residue and more particularly when both are pressor amine residues.

Proceeding to a better understanding of the invention, illustrative specific procedures for the preparation of representative compounds falling within the general formula are set forth in the following example.

EXAMPLE

*Preparation of alpha-diethylamino-N-1-methylhexyl acetamide*

In order to first prepare the chloracetyl intermediate, 46 grams of 1-methylhexyl amine was slowly added with stirring to a solution of 22.6 grams of chloracetyl chloride in 100 cc. of benzene. After the solution had cooled, no precipitate of salt appeared. The solution was concentrated and distilled in vacuo. The product, N - alpha - chloracetyl - 1 - methylhexylamine weighed 30 grams and boiled at 113–115° C. at a pressure of 3 mm.

A solution of 8.5 grams of N-alpha-chloracetyl-1-methylhexylamine and 3 grams of diethylamine in 25 cc. of n-butanol, together with 3.5 grams of sodium carbonate was refluxed for 12 hours. The organic layer was then washed with water until free of halogen, dried and concentrated and distilled in vacuo. The product was a colorless oil boiling from 133–135° C. at a pressure of 3 mm. The yield of alpha-diethylamino-N-1-methylhexyl acetamide was 9.5 grams.

By procedures analogous to those described in the above example, the appropriate secondary amine $R_1R_2NH$ and the appropriate chloracetamide corresponding to the formula

where $R_1$, $R_2$ and $R_3$ represent radicals as indicated above, can be reacted to form the following substituted glycinamides representative of those comprehended in this invention.

1. Alpha - (N - methyl - N - 1 - methylhexylamino)-N-1,3-dimethylpentyl acetamide.
2. Alpha - (N - methyl - N - 1,3 - dimethylpentylamino)-N-1,3-dimethylpentyl acetamide.
3. Alpha - diethylamino - N - 1,4 - dimethylpentyl acetamide.
4. Alpha - dimethyl - N - 4 - ethyl - 1 - methylhexyl acetamide.
5. Alpha - diethylamino - N - 1,5 - dimethylhexylacetamide.

Substantially all of the products of the invention are high boiling basic liquids of limited solubility. It is contemplated that while the products may be used in their basic form, it is within the scope of this invention that they may be prepared and used in the form of their acid-addition salts. The preparation of such a salt is well-known and generally involves the addition of the selected acid to an ether, alcohol or water solution of the basic product. The acid is chosen to yield a salt which is known to those skilled in the art as being physiologically non-toxic. As examples, the hydrochloride, sulfate or tartrate salts of the new products may be used.

It is further contemplated that those substituted glycinamides, or the non-toxic salts thereof, which are less soluble in dilute acid than 0.5% by weight may be brought into satisfactory solution by the use of solubilizing, surface-active, emulsifying or detergent agents in order to obtain a more complete physiological effect of the specific glycinamide product. Lipoid solvents having a physiologically non-toxic effect such as long-chain fatty acid partial esters of hexitol anhydrides or oxyalkylene derivatives thereof, vegetable and animal oils and ointment bases such as petroleum jelly or cholesterol are examples of solvents that are considered useful in admixture with the substituted glycinamides for obtaining enhanced physiological effect.

Many modifications of the invention will be apparent to those skilled in the art without departure therefrom or from the scope of the claims, and since the foregoing disclosure has been given by way of example for clearness and understanding only, no unnecessary limitations should be understood and the appended claims should be construed as broadly as the state of the art permits.

We claim:

1. New compounds of the group consisting of substituted glycinamides, corresponding to the formula

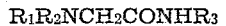

where $R_1$ is a lower alkyl and $R_2$ is an alkyl of not more than 9 carbon atoms while $R_3$ is a branched-chain alkyl radical having 7 to 9 carbon atoms and wherein $NHR_3$ represents the residue of a primary pressor amine; and the non-toxic acid-addition salts of said glycinamides.

2. The new compound, alpha-diethylamino-N-1-methylhexyl acetamide.

WILLIAM F. BRUCE.
JOSEPH SEIFTER.

REFERENCES CITED

The following references are of record in the file of this patent:

UNITED STATES PATENTS

| Number | Name | Date |
|---|---|---|
| 2,073,100 | Eisleb | May 9, 1937 |
| 2,139,190 | Iselin et al. | Dec. 6, 1938 |
| 2,153,707 | Becherer et al. | Apr. 11, 1939 |
| 2,229,744 | Kern | Jan. 28, 1941 |
| 2,256,186 | Balle et al. | Sept. 16, 1941 |
| 2,258,721 | Sallman | Oct. 14, 1941 |
| 2,295,655 | Hentrich et al. | Sept. 15, 1942 |
| 2,326,497 | Riester et al. | Aug. 10, 1943 |
| 2,356,587 | Hentrich et al. | Aug. 22, 1944 |
| 2,411,662 | Martin et al. | Nov. 26, 1946 |

FOREIGN PATENTS

| Number | Country | Date |
|---|---|---|
| 98,236 | Sweden | Mar. 5, 1940 |
| 212,562 | Switzerland | Mar. 3, 1942 |

OTHER REFERENCES

Braun et al.: "Ber. deut. Chem.," vol. 60 (1927), pages 347 and 351.